US009072040B2

(12) United States Patent
Fang

(10) Patent No.: US 9,072,040 B2
(45) Date of Patent: *Jun. 30, 2015

(54) METHOD AND SYSTEM OF INTELLIGENTLY LOAD BALANCING OF WI-FI ACCESS POINT APPARATUS IN A WLAN

(71) Applicant: MEDIUM ACCESS SYSTEMS PRIVATE LIMITED, Singapore (SG)

(72) Inventor: Yang Lit Fang, Singapore (SG)

(73) Assignee: Medium Access Systems Private Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 14/088,489

(22) Filed: Nov. 25, 2013

(65) Prior Publication Data

US 2014/0082200 A1 Mar. 20, 2014

Related U.S. Application Data

(63) Continuation of application No. 13/068,395, filed on May 10, 2011, now Pat. No. 8,593,967, which is a continuation-in-part of application No. 13/043,226, filed on Mar. 8, 2011.

(51) Int. Cl.
| | |
|---|---|
| *H04W 40/24* | (2009.01) |
| *H04W 12/06* | (2009.01) |
| *H04W 48/06* | (2009.01) |
| *H04L 29/06* | (2006.01) |
| *H04W 48/02* | (2009.01) |
| *H04W 48/18* | (2009.01) |
| *H04W 48/14* | (2009.01) |

(52) U.S. Cl.
CPC ............ *H04W 40/24* (2013.01); *H04L 63/0838* (2013.01); *H04L 63/0853* (2013.01); *H04W 12/06* (2013.01); *H04W 48/02* (2013.01); *H04W 48/06* (2013.01); *H04W 48/18* (2013.01); *H04W 48/14* (2013.01)

(58) Field of Classification Search
CPC ...................................................... H04W 40/24
USPC ......... 370/235, 310, 315, 328, 331, 335, 352; 455/41.2, 411, 436, 445, 466
See application file for complete search history.

(56) References Cited

U.S. PATENT DOCUMENTS

| | | | | |
|---|---|---|---|---|
| 6,842,460 | B1 * | 1/2005 | Olkkonen et al. | 370/465 |
| 7,263,076 | B1 * | 8/2007 | Leibovitz et al. | 370/310 |
| 7,275,157 | B2 * | 9/2007 | Cam Winget | 713/168 |
| 7,293,088 | B2 * | 11/2007 | Douglas et al. | 709/224 |
| 7,317,914 | B2 * | 1/2008 | Adya et al. | 455/421 |
| 7,440,573 | B2 * | 10/2008 | Lor et al. | 380/270 |
| 7,701,912 | B2 * | 4/2010 | Thompson et al. | 370/338 |

(Continued)

*Primary Examiner* — Andrew Lai
*Assistant Examiner* — Andrew C Lee
(74) *Attorney, Agent, or Firm* — James R. Klaiber; Pryor Cashman LLP

(57) ABSTRACT

A computer networking infrastructure for load balancing, which comprises a network, access points each with a first service set identifier, computing devices and a computing system. The computing system can receive requests from computing devices to access the network via a second service set identifier of an access point. In response to a request to access the network from a computing device, the computing system generates a list of access points which are able to support a connection with the computing device. The computing device may connect to the network via an access point on the list and via the first service set identifier.

19 Claims, 5 Drawing Sheets

(56) References Cited

U.S. PATENT DOCUMENTS

| | | | |
|---|---|---|---|
| 7,885,639 B1* | 2/2011 | Satish et al. | 455/410 |
| 8,155,629 B2* | 4/2012 | Gazzard | 455/414.1 |
| 8,305,980 B1* | 11/2012 | Nix | 370/329 |
| 2003/0156558 A1* | 8/2003 | Cromer et al. | 370/331 |
| 2005/0002405 A1* | 1/2005 | Gao | 370/401 |
| 2005/0050318 A1* | 3/2005 | Alone et al. | 713/155 |
| 2005/0286466 A1* | 12/2005 | Tagg et al. | 370/329 |
| 2006/0064588 A1* | 3/2006 | Tidwell et al. | 713/169 |
| 2006/0072760 A1* | 4/2006 | Gates | 380/270 |
| 2007/0019584 A1* | 1/2007 | Qi et al. | 370/331 |
| 2007/0019586 A1* | 1/2007 | Nanda et al. | 370/335 |
| 2007/0081477 A1* | 4/2007 | Jakkahalli et al. | 370/310 |
| 2007/0124490 A1* | 5/2007 | Kalavade et al. | 709/230 |
| 2007/0143827 A1* | 6/2007 | Nicodemus et al. | 726/2 |
| 2007/0147324 A1* | 6/2007 | McGary | 370/338 |
| 2007/0208937 A1* | 9/2007 | Cam-Winget et al. | 713/168 |
| 2009/0249458 A1* | 10/2009 | Banga et al. | 726/7 |
| 2010/0017867 A1* | 1/2010 | Fascenda | 726/9 |
| 2010/0263022 A1* | 10/2010 | Wynn et al. | 726/3 |
| 2011/0047603 A1* | 2/2011 | Gordon et al. | 726/5 |
| 2011/0167263 A1* | 7/2011 | Cross et al. | 713/168 |
| 2011/0202956 A1* | 8/2011 | Connelly et al. | 725/38 |
| 2011/0211511 A1* | 9/2011 | Bakthavathsalu et al. | 370/311 |
| 2012/0155426 A1* | 6/2012 | Verma et al. | 370/331 |
| 2012/0324091 A9* | 12/2012 | Raleigh et al. | 709/224 |

* cited by examiner

METHOD AND SYSTEM OF INTELLIGENTLY LOAD BALANCING OF WI-FI ACCESS POINT APPARATUS IN A WLAN

This application is a Continuation application of application Ser. No. 13/068,395, filed May 10, 2011, and which will issue as U.S. Pat. No. 8,593,967 on Nov. 26, 2013, which itself is a continuation-in-part of co-pending U.S. patent application Ser. No. 13/043,226, filed Mar. 8, 2011, entitled "Method and System for Data Offloading in Mobile Communications," the disclosures of which are both hereby incorporated by reference.

FIELD

The present disclosure relates to a method and system for load balancing in wireless computer networking.

BACKGROUND

Wireless computer networks tend to suffer Quality of Service (QoS) issues due to increases in the number of users on the wireless network, and increases in data and bandwidth required for the vast range of application programs and services available to devices interfacing on the wireless network, such as multimedia streaming, video-chat, internet browsing, email, file sharing, cloud based internet services and other application programs.

This especially true with enterprise Wi-Fi or wireless hotspot networks in dense user environments—e.g., shopping malls, transportation hubs such as train stations and airports, as well as lecture and conference halls. In most wireless computer networks, users (also referred to herein as clients) connect to the wireless network through base stations, referred to herein as access points ("APs"), and the service set identifiers ("SSID") of those APs.

Problems arise when the number of clients exceeds the number an AP can manage or support, which results in some clients not being able to connect. Alternatively, if an AP's capacity is suited for a large volume of clients, data rates may still be greatly reduced due such systems having limits on Wi-Fi access data rates to accommodate for a large volume of clients. Moreover, installing another AP with same SSID in the vicinity of a choke point does not fully solve the problem, because, in such a configuration, Wi-Fi clients are only designed to login to the AP with the strongest signal or the first AP detected. Such a system would not determine which AP would provide optimal QoS when one or more APs are available to provide wireless network access.

Certain prior attempts to resolve this problem use a method of reducing the radio frequency ("RF") transmission power to reduce the Wi-Fi signal range or coverage. More APs can then be deployed in the same volume area and the system adjusts the transmitted RF power to limit client login. However, this does not address the issue of distributing the Wi-Fi client connection or balance data loading among several APs. What is needed is system and method for permitting clients to connect to a particular AP when other APs in the same wireless network are unable to support further clients.

SUMMARY

In one aspect, the present invention is a computer networking infrastructure for load balancing, which comprises: one or more access points, wherein each of the one or more access points has a first service set identifier; a computing device having at least one access profile; a network connected to the one or more access points; and a computing system, in communication with said network, having at least one memory with at least one region for storing executable program code, and at least one processor for executing the program code stored in the memory. When the program code is executed, it performs the following: receives a request from the computing device to access the network, wherein the request includes the at least one access profile and the request is received via a second service set identifier of one of the one or more access points; determines whether the computing device is permitted to access the network based on the at least one access profile; and responsive to a determination that the computing device is permitted to access the network, generates a list comprising at least one of the one or more access points able to support a connection with the computing device, and sends the list to the computing device.

In another aspect, the present invention is a method for load balancing a computer networking infrastructure, which comprises the following: receiving, by a computing system, a request from a computing device to access a network, wherein the computing system includes at least one memory with at least one region for storing executable program code and at least one processor for executing the program code stored in the memory, the computing device includes at least one access profile, the network is connected to one or more access points, each of the one or more access points has a first service set identifier, the request includes the at least one access profile, and the request is received via a second service set identifier of one of the one or more access points; determining, by the computing system, whether the computing device is permitted to access the network based on the at least one access profile; and responsive to a determination that the computing device is permitted to access the network, generating, by the computing system, a list comprising at least one of the one or more access points able to support a connection with the computing device, and sending, by the computing system, the list to the computing device.

In another aspect, the present invention is a computer networking infrastructure for load balancing, which comprises: a beacon access point having a first and second service set identifier; one or more other access points, each having a first service set identifier; a computing device having at least one access profile; a network connected to the one or more other access points; and a computing system having at least one memory with at least one region for storing executable program code, and at least one processor for executing the program code stored in the memory. When the program code is executed, it performs the following: receives a request from the computing device to access the network, wherein the request includes the at least one access profile and the request is received via the second service set identifier; determines whether the computing device is permitted to access the network based on the at least one access profile; determines whether each of the beacon access point and the one or more other access points is able to support a connection with the computing device; and responsive to a determination that the computing device is permitted to access the network, generates a list comprising at least one of the one or more other access points and the beacon access point which are able to support a connection with the computing device, and sends the list to the computing device.

In another aspect, the present invention is a method for load balancing a computer networking infrastructure, which comprises the following: receiving, by a computing system, a request from a computing device to access a network, wherein the computing system includes at least one memory with at least one region for storing executable program code and at least one processor for executing the program code stored in the memory, the computing device includes at least one access profile, the network is connected to one or more other access points, each of the one or more other access points has a first service set identifier, the request includes the at least one access profile, and the request is received via a second service set identifier of a beacon access point; determining, by the computing system, whether the computing device is permitted to access the network based on the at least one access profile; determining, by the computing system, whether each of the beacon access point and the one or more other access points is able to support a connection with the computing device; and responsive to a determination that the computing device is permitted to access the network, generating, by the computing system, a list comprising at least one of the one or more other access points and the beacon access point which are able to support a connection with the computing device, and sending, by the computing system, the list to the computing device.

In another aspect, the present invention is a beacon access point in a computer networking infrastructure for load balancing. The beacon access point is in communication with a computing device, a computing system, and a network connected to one or more other access points each having a first service set identifier. The beacon access point includes at least one memory with at least one region for storing executable program code, at least one processor for executing the program code stored in the memory. The beacon access point is configured to: receive a request from the computing device to access the network, wherein the request includes at least one access profile associated with the computing device and the request is received via a second service set identifier of the beacon access point; and transmit the request to the computing system; receive a list from the computing system comprising at least one of the one or more other access points and the beacon access point which are able to support a connection with the computing device; transmit the list to the computing device.

In another aspect, the present invention is a method of operating a beacon access point in a computer networking infrastructure for load balancing. The beacon access point is in communication with a computing device, a computing system, and a network connected to one or more other access points each having a first service set identifier. The beacon access point includes at least one memory with at least one region for storing executable program code, at least one processor for executing the program code stored in the memory. The method comprises the following: receiving, by the beacon access point, a request from the computing device to access the network, wherein the request includes at least one access profile associated with the computing device, and the request is received via a second service set identifier of the beacon access point; transmitting, by the beacon access point, the request to the computing system; receiving, by the beacon access point, a list from the computing system comprising at least one of the one or more other access points and the beacon access point which are able to support a connection with the computing device; and transmitting, by the beacon access point, the list to the computing device.

In another aspect, the present invention is a computing system for load balancing. The computing system is in communication with one or more access points, a computing device, and a network. The computing system includes at least one memory with at least one region for storing executable program code, and at least one processor for executing the program code stored in the memory. When the program code is executed, it performs the following: receives a request from the computing device to access the network, wherein the request includes at least one access profile associated with the computing device and the request is received via a second service set identifier associated with one of the one or more access points; determines whether the computing device is permitted to access the network based on the at least one access profile; and responsive to a determination that the computing device is permitted to access the network, generates a list comprising at least one of the one or more access points able to support a connection with the computing device, and sends the list to the computing device.

In another aspect, the present invention is a method for operating a computing system for load balancing, in communication with one or more access points, a computing device, and a network. The computing system includes at least one memory with at least one region for storing executable program code and at least one processor for executing the program code stored in the memory. The method comprises: receiving, by the computing system, a request from the computing device to access the network, wherein, the request includes at least one access profile associated with the computing device, and the request is received via a second service set identifier associated with one of the one or more access points; determining, by the computing system, whether the computing device is permitted to access the network based on the at least one access profile; and responsive to a determination that the computing device is permitted to access the network, generating, by the computing system, a list comprising at least one of the one or more access points able to support a connection with the computing device, and sending, by the computing system, the list to the computing device.

BRIEF DESCRIPTION OF THE DRAWINGS

Example embodiments of the disclosure will be described by way of example only and with reference to the drawings, in which.

The drawings are exemplary, not limiting. Items that are labeled with the same reference number in multiple figures refer to the same item throughout the figures.

DETAILED DESCRIPTION

Overview

Various embodiments of the present invention will now be described in greater detail with reference to the drawings.

Figure 1:
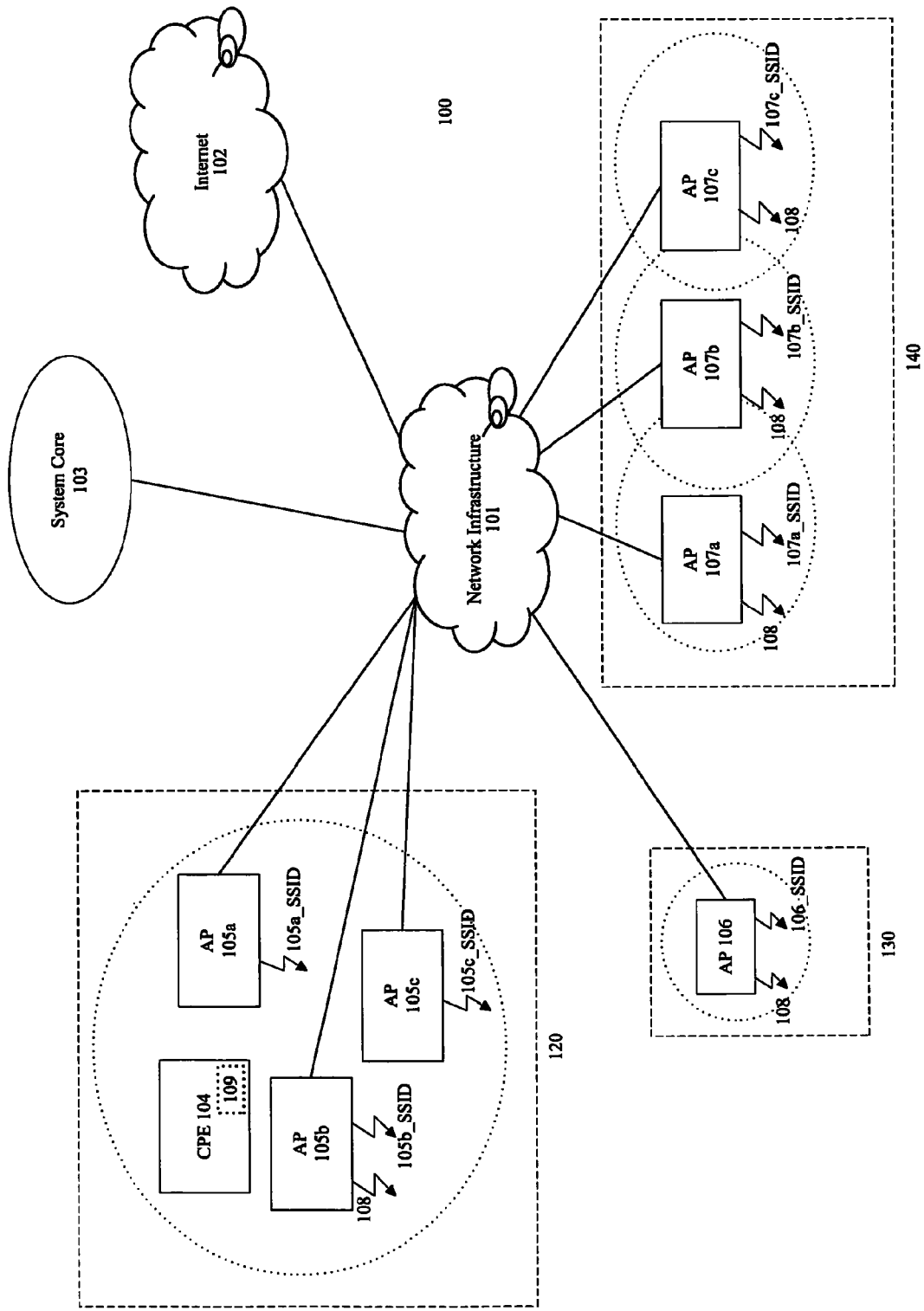
FIG. 1 shows a schematic diagram of one aspect of the present invention for load balancing in a wireless network communication infrastructure.

Referring to FIG. 1, System 100 illustrates an embodiment of the load balancing system of the present invention. Network Infrastructure 101 comprises a wireless local area network (WLAN) accessible via one or more wireless APs 105a, 105b, 105c, 106, 107a, 107b, and 107c, and connected to System Core 103 and Internet 102. In the preferred embodiment, the APs are Wi-Fi access points operating in accordance with IEEE 802.11-based standards and connected to Network Infrastructure 101 via wireless or wired connections.

As shown in FIG. 1, Client Personal Equipment ("CPE") 104 is located within the wireless signal coverage (also referred to herein as "range") of APs 105a, 105b and 105c, whose wireless signal coverages substantially overlap. The wireless signal coverage of AP 106 does not intersect with the wireless signal coverage of any of the other APs. Portions of wireless signal coverage of AP 107a overlaps with portions of the wireless signal coverage of AP 107b, while other portions of the wireless signal coverage AP 107b overlaps with portions of the wireless signal coverage of AP 107c. APs 105a, 105b, 105c, 106, 107a, 107b, and 107c each operate a Beacon SSID 108. Each AP shown in FIG. 1 also operates a unique SSID, according to the following table:

TABLE 1

Access Points of FIG. 1 and Unique SSIDs

| AP | SSID |
|---|---|
| 105a | 105a_SSID |
| 105b | 105b_SSID |
| 105c | 105c_SSID |
| 106 | 106_SSID |
| 107a | 107a_SSID |
| 107b | 107b_SSID |
| 107c | 107c_SSID |

CPE 104 may be a cellular phone, smart phone, tablet, portable computer, desktop computer, laptop computer, game console, personal media player, handheld computing device, portable gaming device, or similar devices, and is not limited to CPU based devices. Access Controller 109 is installed on CPE 104 and communicates with System Core 103 via Beacon SSID 108, any AP (e.g., APs 107a, 107b, 107c), and the Network Infrastructure 101 to permit CPE 104 to access Internet 102 or any wired or wireless network associated with, connected to, or accessible by Network Infrastructure 101. Access Controller 109 may be a service, a daemon or drivers. The physical location of CPE 104 shown in FIG. 1 is exemplary, and CPE 104 may be located anywhere on the system, and may even not be in wireless signal coverage of any of the APs. Moreover, System 100 has sufficient capacity to operate in dense user environments with more than one CPE 104. In one aspect, System 100 operates with many CPEs. Each CPE 104 may have a unique token, profile, certificate or other authentication information, referred to herein as CPE TPC, used in authenticating each CPE 104 in System 100.

As shown, Network Infrastructure 101 may access or connect to a data network such as the Internet 102. In another aspect, Network Infrastructure 101 may facilitate connection to any other private or public data network, server, or database, whether via the Internet or direct connection. Additionally, Network Infrastructure 101 may either have a direct communication link or an indirect communication link to Internet 102 or any other intermediate communication network. Network Infrastructure 101 may comprise one or more computer servers, one or more networking systems or devices, or one or more mobile telecommunications systems or devices.

The System 100 is configured to provide improved QoS for CPEs of the network, such as CPE 104. For example, as will be described in greater detail below, System Core 103 directs CPEs to login to certain APs by communicating with Access Controller 109. System Core 103 maintains information on the loading of the APs, such as the number of CPEs connected to each AP. System Core 103 also determines whether an AP has sufficient capacity to accept or support new CPE connections, or in other words, sufficient capacity to not cause an imbalance in the client loading of System 100 nor an overloading in the AP—such an AP is referred to herein as an "available AP". In this way, System Core 103 is able to perform load balancing of the APs and System 100 by directing CPEs to APs with available bandwidth and client capacity.

System Core

Figure 2:
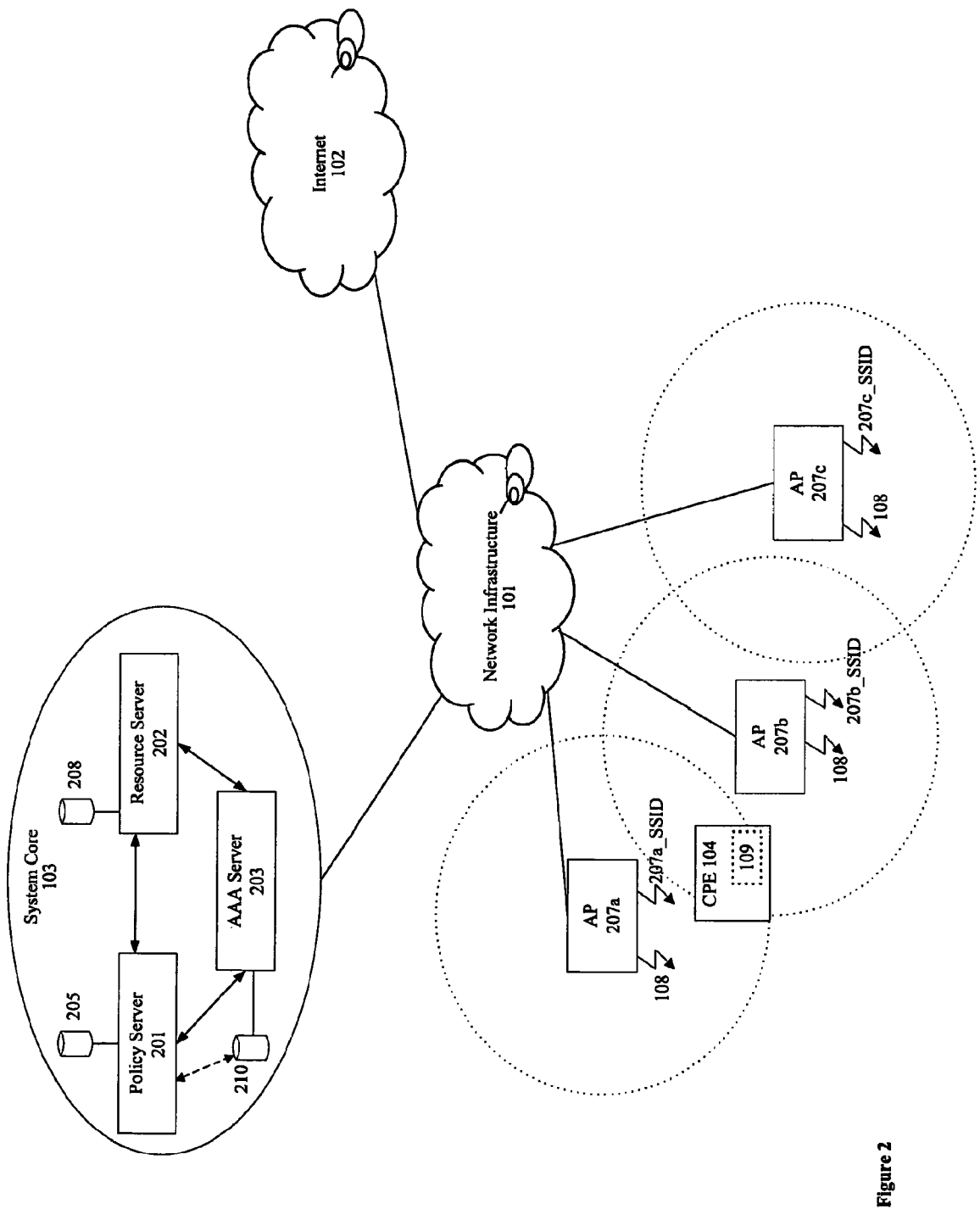
FIG. 2 shows a schematic diagram of another aspect of the present invention for load balancing in a wireless network communication infrastructure.

FIG. 2 shows another configuration of System 100. Referring to FIG. 2, System Core 103 includes three main components or modules for carrying out its primary functions. System Core 103 comprises a Policy Server 201, a Resource Server 202, and an authentication, authorization, and accounting server ("AAA Server") 203. The servers 201, 202, and 203 of System Core 103 may be provided on one or more computer systems or configurable hardware devices. Such computer systems or configurable hardware may include one or more processors, memory, operating systems, and network interfaces. In one aspect, all the servers 201, 202, and 203 of System Core 103 are provided on one computer system having at least one processor, and at least one memory. Additionally, the servers 201, 202, and 203 may be one or more application programs programmed or coded to perform the server functions. The server functions may be implemented and configured in various ways to provide communication and data transfer between the servers. Each server will be described in further detail below.

Policy Server

Policy Server 201 comprises information on each CPE and each CPE's associated access profile which determines whether a CPE qualifies or is allowed to access the network. An access profile may be configured based on a CPE's data service plan, including whether the CPE is a prepaid customer or postpaid customer. An access profile may further include information regarding the bandwidth of the CPE's service plan. An access profile may also include information unique to a CPE, client or subscriber. An access profile may also include information associated with or contained in a CPE TPC. Access profiles may be stored in a Policy Database 205 of, or accessible by, Policy Server 201. Policy Database 205 may be a memory system maintained and updated by the wireless network service operators (e.g., operators of System 100). Such operators include Internet Service Providers, wireless hotspot administrators (e.g., malls, bookstores, coffee shops), wireless connectivity administrators (e.g., hotels, universities, colleges, apartment buildings), and similar providers of wireless networking or internet access. In addition, wireless network service operators may dynamically change CPE access policies and profiles to control the access capability of a particular CPE or groups of CPEs. For example, access priority may be given to prepaid users over postpaid users, vice versa, or based on subscription packages.

Figure 3A:
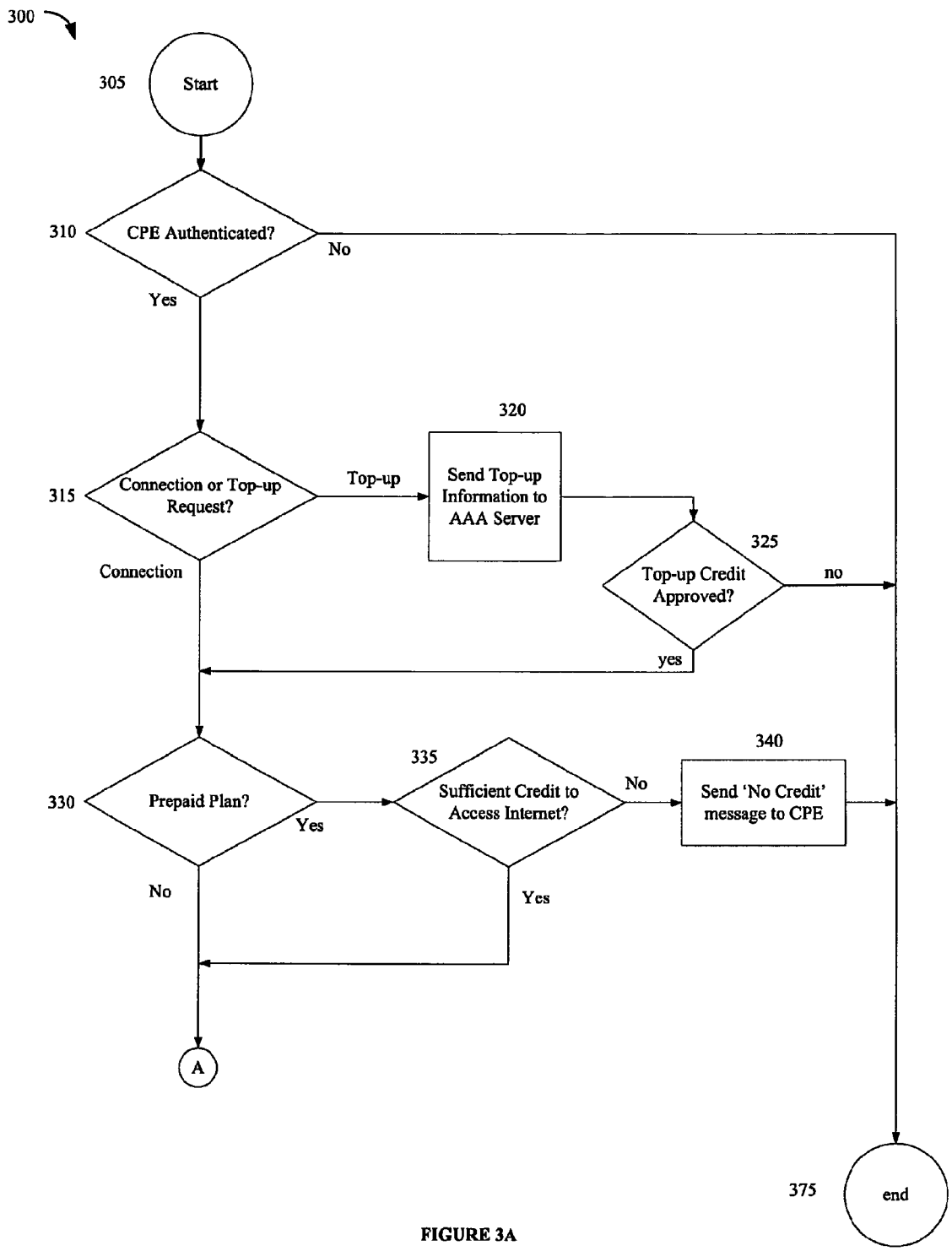
FIGS. 3A and 3B shows a flow diagram of a method of load balancing in a wireless network communication infrastructure according to one aspect of the present invention.
Figure 3B:
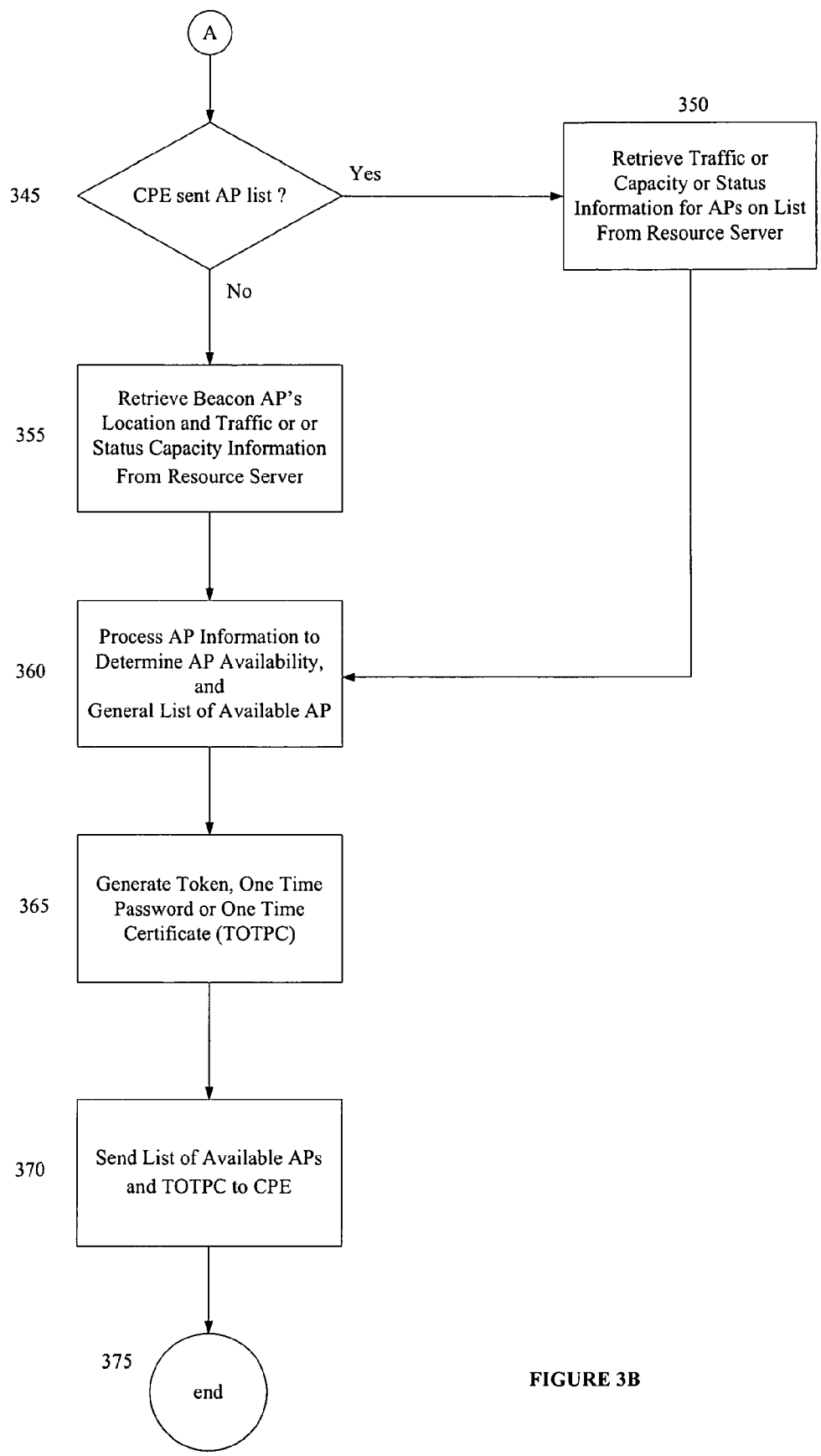

Capacity or traffic volume on each AP is tracked by Resource Server 202 and provided to Policy Server 201 in the form of resource status information. Ultimately, Policy Server 201 is configured to assign one or more APs to a CPE to provide the optimal QoS. This assignment may be determined based on the loading factor of each AP maintained by the Resource Server 202. In addition, Policy Server 201 communicates with AAA Server 203 to determine whether a CPE has sufficient credit to continue accessing Internet 102. FIGS. 3A and 3B illustrates an aspect of the present invention in determining the grant of access to the CPE by System 100. FIGS. 3A and 3B will be described in more detail below.

Resource Server

Resource Server 202 is configured to track the status of the APs in System 100. For example, Resource Server 202 may be configured to track the number of CPEs connected to each AP, the maximum number of CPEs each AP is able to support, traffic condition or volume or capacity information, and individual and overall status of the APs (collectively, "capacity or status information"). In one aspect, the tracking performed by Resource Server 202 is in real time. AP status information may include whether an AP is dead, removed, unable to access to the internet, unresponsive for a certain period of time, or otherwise inoperable. In another aspect, where a problem exists with an AP, the Resource Server 202 may alert wireless network service operators to rectify the problem.

In another aspect, Resource Server 202 may also store location information, connection range or wireless signal coverage information for each AP in Resource Database 208 of, or accessible by, Resource Server 202. This information may be used to determine which AP is an available AP. Resource Database 208 may be stored in a memory system.

AAA Server

AAA Server 203 handles authorization of CPEs for access to a data network, Network Infrastructure 101 or Internet 102. AAA Server 203 may store accounting information on the data usage by CPEs. In one aspect, the data usage information is stored by the APs during a data session and sent to AAA Server 203 periodically, at the end of the data session, or when a connection is lost. AAA Server 203 may also update Resource Server 202 with information regarding CPE connections to APs.

In another aspect, AAA Server 203 maintains credit information for and deducts usage for CPEs on a prepaid service plan. AAA Server 203 may also communicate with a billing system for CPEs on a postpaid service plan.

In another aspect, information sent to, generated by or stored by AAA Server 203 are stored in AAA Database 210 of, or accessible by, AAA Server 203. AAA Database 210 may be stored in a memory system.

Beacon SSID

APs may transmit Beacon SSID 108, which may operate according to IEEE 802.11-based standards. APs may also transmit a unique SSID for CPEs to gain access to the Network Infrastructure 101 and Internet 102. In System 100, Beacon SSID 108 is the same among all APs transmitting or operating a Beacon SSID as shown in FIGS. 1 & 2. In another aspect, not shown, APs within the same network may use different Beacon SSIDs.

In one aspect, Beacon SSID 108 operates on a communications port for authentication and communication with Policy Server 201. For example, the communications port used for the Beacon SSID 108 may be port 1812 (also referred to as the "authentication port"). Beacon SSID 108 provides a management path between the Access Controller 109 to communicate to Policy Server 201, for example, to request a connection to Internet 102 via an AP, to top-up credit, or to check usage information.

In another aspect, the communications port for Beacon SSID 108 may not be used for internet connection. Here, access to port 80 (http), port 8080 (alternate http), port 21 (ftp) and other communications ports may be blocked or limited.

Access Points

APs (e.g., APs 105a, 105b, 105c, 106, 107a, 107b, and 107c) provide wireless access to the Network Infrastructure 101. APs may include one or more processors, memory, operating systems, radios, transceivers, antennas and network interfaces. APs may use existing ISP network infrastructure to connect CPEs to the internet. APs may be configured to provide accounting information on CPE data usage to AAA Server 203. In one aspect, high volume traffic or user data is instead routed directly to an ISP or wireless network service operators.

As shown in FIG. 1, each AP 105a, 105b, 105c, 106, 107a, 107b, and 107c has a unique SSID, which may be hidden or searchable, as discussed above with reference to Table 1.

APs may or may not broadcast a Beacon SSID 108. Whether Beacon SSID 108 is broadcasted by a particular AP depends on the type of AP configuration deployed. For example, an AP can be deployed without any other AP in its Wi-Fi coverage range (FIG. 1, Configuration 130), in an overlapping AP configuration of Wi-Fi coverage (Configuration 140), or in a multiple AP configuration covering substantially the same geographic area (Configuration 120). The type of configuration may depend on the coverage plan or demography of users. In Configuration 140, each AP will broadcast its own Beacon SSID 108 as shown in FIG. 1. For example, Configuration 120 may be deployed in a lecture or conference hall with hundreds of CPEs. In such a scenario, there will be multiple APs covering substantially the same geographic area, but only one or two APs may be broadcasting Beacon SSID 108.

Where an AP is broadcasting Beacon SSID 108, it may be broadcasting both Beacon SSID 108 and its unique SSID at the same time. For example, in FIG. 1, AP 107a is shown to broadcast both Beacon SSID 108 and SSID 107a_SSID.

Access Controller/Daemon

As previously discussed, each CPE in System 100 has an Access Controller 109. In one aspect, the Access Controller 109 may be a daemon or service running in the background of the CPE software system, with minimal or no need for user interaction. In another aspect, Access Controller 109 may be an application program. In another aspect, Access Controller 109 may be a user activated system service, wherein Access Controller 109 activates the Wi-Fi radio and begins scanning for Beacon SSIDs. In another aspect, Access Controller 109 runs at the start up of a CPE and scans for Beacon SSIDs when the Wi-Fi radio is activated or the hardware Wi-Fi switch is in the 'ON' position. In yet another aspect, Access Controller 109 may stay dormant until an application or a service on the CPE requests a network connection.

In the one embodiment, Access Controller 109 detects Beacon SSID 108 and sends a message to the Policy Server 201 via Beacon SSID 108 requesting access to the Network Infrastructure 101 or Internet 102. In one aspect, Access Controller 109 may also perform authentication with the System Core 103 based on CPE 104's CPE TPC. CPE TPC may be provided by or obtained from a USB device (such as a USB authentication device), SD card, Micro SD card, SIM card, integrated circuit fixed or embedded in CPE 104 or similar device attached to or accessible by CPE 104. The CPE TPC may consist of an ID number ("IDN") that identifies the subscriber or CPE, and may be one-time write/multi read. Each CPE TPC may also consists of a unique Ki. The same Ki is also stored in Policy Server 201, which, in one aspect, may be part of an access profile. CPE TPC may also store a list of Beacon SSIDs. The CPE TPC may employ encryption algorithms in signing and using Ki. Further use and explanation of the Ki and authentication will be described below.

Access Controller 109 may receive information from Policy Server 201 regarding available APs for access to Network Infrastructure 101 or Internet 102. Such information may include the SSIDs of the respective APs.

In another aspect, each CPE maintains a list of Beacon SSIDs 108, where such a list may be different from the known SSID list or history. Alternatively, such a list may be maintained on the CPE TPC. Access Controller 109 may connect to any of the available Beacon SSIDs included on the list.

In another aspect, connection to certain Beacon SSIDs may be on a priority basis. This will be explained by way of example: an enterprise company EntCo operates a network with Beacon SSID "ENT_A," and EntCo is also a subscriber of IntServ's internet service to provide additional coverage for offsite employees of EntCo. IntServ operates its network with Beacon SSID "ISP_X". An employee's CPE stores information regarding ENT_A and ISP_X, with ENT_A at the highest priority. Thus, if the employee is in an area with access to both ENT_A and ISP_X, Access Controller 109 will connect to ENT_A. In this example, EntCo may prefer to provide to the employee its lower cost internet access when available, and only permit use of IntServ's services for coverage outside of the availability of ENT_A. Here, EntCo may have a service agreement with IntServ to provide EntCo employees with Wi-Fi roaming in IntServ's coverage area.

In another example of providing priority to certain Beacon SSIDs, a user may subscribe to IntServ's Internet service and to IntRoam's roaming Internet service which provides Internet service to the user in a different region. In this example, IntServ operates Beacon SSID "ISP_Y" and IntRoam operates Beacon SSID "ISP_Roam." Here, ISP_Y may be given higher priority over ISP_Roam, and thus when the user has access to, or within coverage of, both ISP_Y and ISP_Roam, Access Controller 109 may prioritize ISP_Y. In this example, IntServ and IntDiff may each have its own Policy Server or System Core, and a bridging agreement between IntServ and IntDiff may allow the two Policy Servers or System Cores to communicate to each other, for example via the Internet, to validate CPE identity and validity of usage. Accounting may also be managed by one or more AAA Servers.

System Operation

Figure 4:
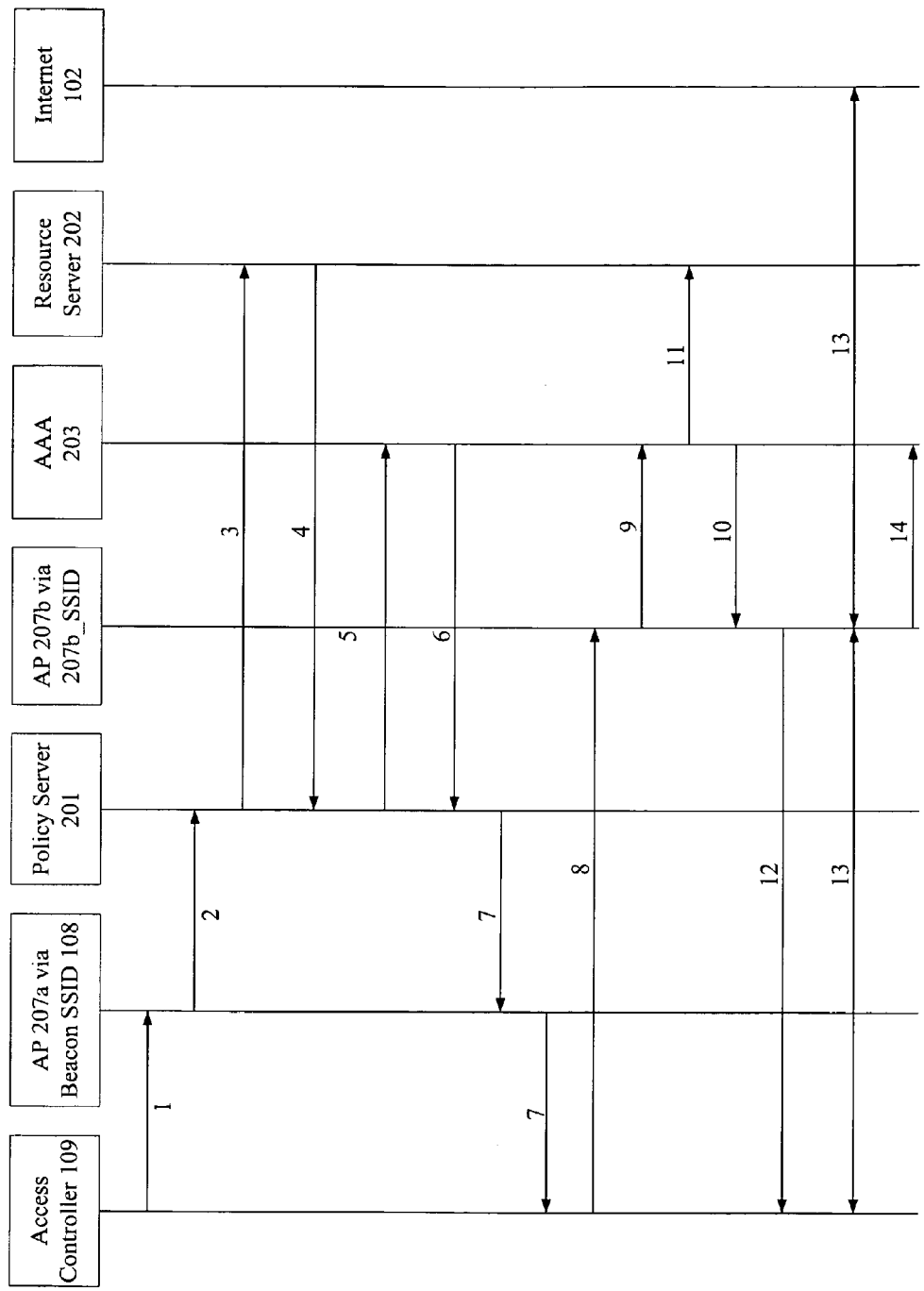
FIG. 4 shows the data flow during the load balancing protocol sequence in accordance one aspect of the present invention.

With reference to FIGS. 2 and 4, the general system operation will now be described by way of example.

A subscriber or user in System 100 attempting to access Internet 102 has Access Controller 109 running on their CPE 104. In the system configuration of FIG. 2, CPE 104 and/or Access Controller 109 scan for available Beacon SSIDs. Here, CPE 104 and/or Access Controller 109 detect the Beacon SSID 108 of APs 207a and 207b. In this example, Access Controller 109 connects to Beacon SSID 108 via AP 207a and sends a request to Policy Server 201 via Beacon SSID 108 to access Internet 102. This request may include information regarding CPE 104 and authentication information, such as a CPE TPC, as described above. This request is shown in FIG. 4 as Data 1 and Data 2.

Policy Server 201 receives the request from CPE 104. If CPE 104 is on a prepaid plan, Policy Server 201 queries AAA Database 210 to determine whether CPE 104 has authorization to access Internet 102. Such a determination may be based on CPE 104's CPE TPC and/or the access profile associated with CPE 104. Policy Server 201 may make this query directly to AAA Database 210, or may make it via AAA Server 203. If CPE 104 has authorization, Policy Server 201 sends a request to Resource Server 202 for available APs (FIG. 4, Data 3), also known as a "resource status request." This request may include information regarding the physical location of AP 207a and/or relative location of CPE 104 to AP 207a.

Upon receiving Data 3, Resource Server 202 generates a list of one or more APs within the wireless signal coverage of AP 207a which are available APs, e.g., APs able to accept or support new CPE connections. In generating this list of available APs, Resource Server 202 may retrieve capacity or status information from Resource Database 208. This list may further include the SSIDs of, or capacity or status information for, the APs on this list. For example, APs within proper coverage may be APs 207a and 207b, but Resource Server 202 shows that AP 207a does not have capacity to permit access by another CPE. Thus, the list of available APs may only include AP 207b. The list is then sent to Policy Server 201 (FIG. 4, Data 4, also referred to as a "resource status reply").

Upon receiving Data 4, Policy Server 201 notifies AAA Server 203 of CPE's 104 attempt to access Internet 102 (FIG. 4, Data 5). If CPE 104's service plan is prepaid, AAA Server 203 determines whether CPE 104 has sufficient credit to access Internet 102. If CPE 104 is subscribed to a prepaid service plan and has sufficient credit, or alternatively on a postpaid service plan, AAA Server 203 notifies Policy Server 201 of the same (FIG. 4, Data 6). Alternatively, if CPE 104 in subscribed to a prepaid service plan and has insufficient credit, AAA Server 203 notifies Policy Server 201 of the same (not shown in FIG. 4). In one aspect, Policy Server 201 will communicate with Access Controller 109 that CPE 104 has insufficient credit (again, not shown in FIG. 4).

Upon receiving Data 6, Policy Server 201 generates a token, one time password or one time certificate (collectively, "TOTPC"). Policy Server 201 then sends Data 4 (or the contents thereof, e.g., the list of available APs with AP SSIDs) and the TOTPC to Access Controller 109 (FIG. 4, Data 7). Data 7 may include further information necessary for CPE 104 to access Internet 102 via one of the available APs. Policy Server 201 may also send to AAA Server 202 or AAA Database 210 the TOTPC generated by Policy Server 201 for later authentication or verification purposes.

Upon receiving Data 7, Access Controller 109 uses the list of available APs and TOTPC to connect to Internet 102. If the list of available APs is ordered according to signal strength, Access Controller 109 may first initiate a connection to the available AP with the highest signal strength. In one aspect, such a connection may be made via a SSID that is not Beacon SSID 108. In this example, Access Controller 109 will attempt to login to AP 207b (the only AP on the list) via 207b_SSID using the TOTPC (FIG. 4, Data 8).

Upon receiving Data 8, AP 207b will forward Access Controller 109's attempt to login to AP 207b to AAA Server 203 (FIG. 4, Data 9). AAA Server 203 then authenticates and authorizes Access Controller 109's attempt by comparing the TOTPC sent by Access Controller 109 against TOTPCs stored in AAA Database 210. If the TOTPC sent by Access Controller 109 matches one or more TOTPCs in AAA Database 210, AAA Server 203 communicates with AP 207b to allow CPE 104 to access Internet 102 and communicates with Resource Server 202 that another CPE has logged into AP 207b (FIG. 4, Data 10 and Data 11, respectively). Resource Server 202 may update the capacity information stored in Resource Database 208. In another aspect, AAA Server 203 may also start accounting CPE 104's data usage. In yet another aspect, AAA Server 203 may indicate the TOTPC as either "used" or "discarded" to prevent further use of the TOTPC.

Upon receiving Data 10, AP 207b forwards the authorization information to Access Controller 109 (FIG. 4, Data 12). Upon receiving Data 12, Access Controller 109 completes the connection and authentication with AP 207b. In one aspect, this connection and authentication may use IEEE 802.11-based protocols. Once the connection is established, CPE 104 may access Internet 102 directly or via Access Controller 109 (FIG. 4, Data Connection 13).

In one aspect, AP 207b updates AAA Server 203 with data utilization information on a periodic basis or at the end of CPE 104's session (FIG. 4, Data 14). In another aspect, CPE 104's data utilization information may be collected by AP 207*b*, as opposed to routing all traffic to AAA Server 203.

In one embodiment, the steps and processes for load balancing in a Wi-Fi environment described above require minimal user interaction, if any.

In another embodiment, instead of generating a list of available APs, the Resource Server 202 may generate a list of SSIDs associated with the available APs. Here, one of ordinary skill in the art will be able to modify Policy Server 201, AAA Server 203, CPE 104, Access Controller 109, Network Infrastructure 101, and APs 207*a*, 207*b*, and 207*c* accordingly to facilitate the proper operation of the access control protocol as described above.

In another embodiment, if CPE 104 disconnects from AP 207*b*, all of the above steps are performed and communications and data transmissions are sent again in order for CPE 104 to regain access to Internet 102.

In another embodiment, CPE 104 may attempt to access Network Infrastructure 101 in substantially the same manner as accessing Internet 102 as described in the other embodiments of the present invention.

In another embodiment, Data 1 and Data 2 sent to Policy Server 201 may include a list of all the SSIDs detected by CPE 104, wherein the list may be ordered according to signal strength. In this embodiment, Policy Server 201 forwards this list to Resource Server 202, and Resource Server 202 determines which of the detected APs belong to System 100 and returns to Policy Server 201 a list of APs belonging to System 100 with sufficient bandwidth or load capacity for CPE 104 to connect to. In this aspect, the other steps taken in access Internet 102 operate in substantially the same manner as described above.

In another embodiment, CPE 104 may top-up credit on a prepaid service plan without connecting to Internet 102. In this embodiment, CPE 104 may use Access Controller 109 and Beacon SSID 108 to communicate with Policy Server 201 and AAA Server 203. In this type of top-up, Access Controller 109 provides Policy Server 201 with CPE 104's credentials and informs AAA Server 203 of the new credit. In one aspect, this top-up process may require user interaction in providing top-up number and PIN, similar to providing top-up credit for prepaid mobile service plans. In another embodiment, subscribers and users may top-up their prepaid plans via the Internet.

In another embodiment, the present invention may co-exist with a captive portal. In this embodiment, the captive portal would operate on AP 207*a*, but maybe on an SSID which is not Beacon SSID 108 nor 207*a* SSID. Such a captive portal would force CPEs seeking internet access to first view an authentication webpage prior to using Internet 102. The authentication webpage would require CPEs to authenticate or make payment prior to accessing Internet 102. The present invention may also be implemented on a RF power control AP.

FIGS. 3A and 3B illustrates Process 300 according to another aspect of the present invention. In particular, Process 300 shows the decision flow of System Core 103 in permitting access by CPE 104 to Internet 102 or in topping up a prepaid service plan. The process begins at Step 305 where CPE 104 attempts to establish a connection via Beacon SSID 108 at an AP in the network ("Beacon AP"). Policy Server 201 receives information regarding CPE 104 including CPE 104's authentication information. Next, at Step 310, Policy Server 201 determines whether CPE 104's authentication information permits CPE 104 to access Internet 102. If Policy Server 201 determines that CPE 104 authentication information does not permit CPE 104 to access the Internet, Process 300 proceeds to Step 375 where it ends. If CPE 104's authentication information permits CPE 104 to access Internet 102, Process 300 proceeds from Step 310 to Step 315.

At Step 315, Policy Server 201 determines whether CPE 104 is requesting a connection to Internet 102 or to top-up a prepaid service plan. If CPE 104 is requesting a top-up, Process 300 proceeds to Step 320 where Policy Server 201 sends top-up information to AAA Server 203. Process 300 then proceeds to 325 where AAA 203 determines whether the top-up credit is approved. If top-up credit is not approved, Process 300 proceeds to Step 375 where Process 300 ends. Alternatively, if top-up credit is approved, Process 300 proceeds from Step 325 to Step 330.

Alternatively, at Step 315, if CPE 104 is requesting a connection to Internet 102, Process 300 proceeds to Step 330. At Step 330, Policy Server 201 determines whether CPE 104 subscribes to prepaid service plan. If CPE 104 subscribes to a prepaid service plan, Process 300 proceeds to Step 335 where Policy Server determines whether CPE 104 has sufficient credit to access Internet 102. If CPE 104 does not have sufficient credit to access Internet 102, Process 300 proceeds to Step 340 where Policy Server 201 sends to CPE 104 or Access Controller 109 an indication that CPE 104 has insufficient credit. Upon sending such an indication, Process 300 proceeds to Step 375 where it ends.

However, at Step 335, if CPE 104 has sufficient credit on a prepaid service plan, Process 300 proceeds from Step 335 to Step 345. Also, at Step 330, if CPE 104 is not on a prepaid service plan, i.e. it is on a postpaid service plan, Process 300 proceeds from Step 330 to Step 345.

At Step 345, Policy Server 201 determines whether CPE 104 sent a list of APs detected by CPE 104. If a list of detected APs has been sent, Process 300 proceeds from Step 345 to Step 350 whereby Policy Server 201 communicates with Resource Server 202 to receive traffic volume information or capacity or status information for the APs on the list. Alternatively, if a list was not sent, Process 300 proceeds from Step 345 to Step 355 whereby Policy Server 201 communicates with Resource Server 202 to receive a list of APs at or near the Beacon AP as well as capacity or status information for those APs. Alternatively, at Step 355, Policy Server 201 may receive from Resource Server 202 a list of APs having substantially the same wireless coverage as the Beacon AP as well as capacity or status information for those APs. The lists may be ordered based on signal strength or distance from the Beacon AP.

In Steps 350 and 355, Policy Server 201 may also communicate to Resource Server 202 other information, such as authentication information associated with CPE 104.

Both Steps 350 and Step 355 proceed to Step 360, where Policy Server 201 processes the list of APs from either Step 350 or 355, as the case may be, to determine whether any APs are unable to provide a connection for another CPE—e.g., traffic volume or CPE capacity may have reached a maximum for an AP—and generates a list of available APs. Determining which APs are available may also be performed similar to the teachings mentioned above. In one aspect, Policy Server 201 processes the list and capacity information into ranked order of the best to worst APs and generates a ranked AP list. Policy Server 201 may alternatively rank APs according to distance between CPE and the APs, or signal strength.

Next, at Step 365, Policy Server 201 generates a TOTPC for CPE 104 to use in establishing a connection to Internet 102. Policy Server 201 may also send this TOTPC to AAA Server 203 (not shown). Next, at Step 370, Policy Server 201 sends the list of available APs and TOTPC to CPE 104. After Step 370, Process 300 proceeds to Step 375 where it ends.

After Step 375, not shown, CPE 104 may use the list of available APs and TOTPC to connect to an available AP to access Internet 102 as described above.

In one aspect, the communications to and from CPE 104 in any of the Steps in Process 300 may be sent or processed through Beacon AP and/or a Beacon SSID.

In another aspect of Process 300, generating the list of available APs may be performed by the Resource Server 202 instead of the Policy Server 201. Here, one of ordinary skill in the art will be able to modify Steps 350, 355, and 360, and Policy Server 201, Resource Server 202 and/or System Core 103 accordingly to facilitate the proper operation Process 300 as described above.

Authentication of Token (CPE TPC) Process

The following describes one aspect of the authentication of CPE 104 using CPE TPC. This aspect may be employed in any of the embodiments described above, including Step 310 of Process 300.

When Access Controller 109 running on CPE 104 attempts to access Network Infrastructure 101 or Internet 102, Access Controller 109 begins by obtaining a list of Beacon SSIDs stored in the CPE TPC of CPE 104 and searches for a Beacon SSID which matches the list of Beacon SSIDs. Access Controller 109 further obtains the IDN from CPE TPC and transmits the IDN to Policy Server 201, for example, via through the Beacon SSID. In one aspect, a PIN may be required to obtain the IDN.

Policy Server 201 will then query Policy Database 205 for the Ki with the IDN. Policy Server 201 then generates a random number ("RAND") and signs the RAND with the Ki associated with the IDN, which in turn generates a Signed Response 1 ("SRES1").

Policy Server 201 then sends the RAND to Access Controller 109, which then signs the RAND with the Ki stored on CPE TPC, which in turn produces Signed Response 2 ("SRES2"). Access Controller 109 transmits SRES2 to Policy Server 201, where Policy Server 201 compares SRES2 to SRES 1. If SRES2 and SRES1 match, CPE TPC is authenticated, and the CPE 104 is permitted to access Beacon SSID 108 and begin the negotiation of accessible available APs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for load balancing a computer networking infrastructure by a computing device in communication with a computing system including at least one memory with at least one region for storing executable program code and at least one processor for executing the program code stored in the memory, the method comprising:
    (a) sending, by a computing device to the computing system, a request to access a network, wherein said computing device includes at least one access profile, the network is connected to one or more access points, each of the one or more access points has a first service set identifier, the request includes the at least one access profile, and the request is received via a second service set identifier of one of the one or more access points;
    (b) receiving, by said computing device, a list comprising at least one of the one or more access points able to support a connection with said computing device, wherein said list is responsive to a determination that the computing device is permitted to access the network, and;
    (c) connecting, by said computing device, to said one or more access points determined permitted to access the network based on the at least one access profile.

2. The method for load balancing a computer networking infrastructure of claim 1, wherein the list includes the first service set identifier of each of the at least one of the one or more access points.

3. The method for load balancing a computer networking infrastructure of claim 1, wherein the second service set identifier provides a communications medium for providing authentication of access to the network by said computing device.

4. The method for load balancing a computer networking infrastructure of claim 1, wherein the second service set identifier is limited to providing authentication of access to the network by said computing device.

5. The method for load balancing a computer networking infrastructure of claim 1, wherein computing device further comprises a daemon or software application, and wherein communications between said computing device and the computing system are sent and received via the daemon or software application.

6. The method for load balancing a computer networking infrastructure of claim 5, wherein the daemon or software application detects the first and second service set identifiers.

7. The method for load balancing a computer networking infrastructure of claim 1, wherein:
    the method further comprises:
        generating a token, one time password or one time certificate, and
        receiving, by said computing device, said the token, one time password or one time certificate to the computing device;
    wherein said computing device is configured to access the network through one of the at least one of the one or more access points on the list using the token, one time password or one time certificate.

8. The method for load balancing a computer networking infrastructure of claim 1, wherein the at least one access profile is stored on a USB device, SD card, Micro SD card, SIM card, or integrated circuit.

9. The method for load balancing a computer networking infrastructure of claim 1, wherein the first service set identifier of each of the one or more access points are hidden or not broadcasted.

10. The method for load balancing a computer networking infrastructure of claim 1, wherein at least one of the one or more access points is further configured to collect data utilization information for at least one computing device.

11. The method for load balancing a computer networking infrastructure of claim 1, where the list is ordered according to signal strength of the first service set identifier relative to or detected by said computing device.

12. The method for load balancing a computer networking infrastructure of claim 1, wherein the list is ordered according to the distance between each access point and the location of said computing device.

13. The method for load balancing a computer networking infrastructure of claim 1, wherein the network is connected to or comprises the internet.

14. A system for load balancing a computer networking infrastructure for a subscriber attempting to access the Internet comprising:
- a Client Personal Equipment ("CPE") comprising an access controller;
- at least one beacon access point; and
- a computing system including at least one memory with at least one region for storing executable program code and at least one processor for executing the program code stored in the memory;
- wherein said access controller is configured to detect said at least one beacon access point and send a request to access the internet to a policy server of said computing system;
- wherein said policy server is configured to send a request for available access points to a resource server of said computing system;
- wherein said resource server is configured to generate a list of said available access points able to support said CPE and send said list to said policy server;
- wherein, in response to said list generation, said policy server is configured to notify an authentication, authorization, and accounting server ("AAA server") of said computing system of the CPE's attempt to access the Internet;
- wherein said AAA server is configured to notify said policy server if said CPE has a prepaid service plan;
- wherein said policy server is configured to generate a token, one time password, or one time certificate in response to said notification, said token, one time password, or one time certificate comprising information necessary for said CPE to access the Internet via one of said at least one access points, and send said notification and said token, one time password, or one time certificate to said access controller;
- wherein said access controller is configured to attempt to connect to the Internet at one of said at least one access points by means of a beacon SSID;
- wherein said access point is configured to forward said attempt to connect to the Internet to said AAA server;
- wherein said AAA server is configured, upon receipt of said attempt, to authenticate said attempt, communicate with said access point to allow said CPE to connect to the Internet, and notify said resource server that said CPE has connected to said access point;
- wherein said access point is configured to send authorization information to said access controller;
- wherein said access controller is configured to complete said connection with said access point; and
- wherein, upon said completion of said connection, said CPE is configured to access the Internet.

15. A system for load balancing a computer networking infrastructure as claimed in claim 14, wherein said list comprises SSIDs, capacity information, and status information for said available access points.

16. A system for load balancing a computer networking infrastructure as claimed in claim 14, wherein said list comprises SSIDs associated with said available access points instead of said available access points.

17. A method for load balancing a computer networking infrastructure for a subscriber attempting to access the Internet comprising:
- detecting, by an access controller of a Client Personal Equipment ("CPE"), at least one beacon access point and sending, by said access controller, a request to access the internet to a policy server of a computing system including at least one memory with at least one region for storing executable program code and at least one processor for executing the program code stored in the memory;
- sending, by said policy server, a request for available access points to a resource server of said computing system;
- generating, by said resource server, a list of said available access points able to support said CPE and sending, by said resource server, said list to said policy server;
- notifying, by said policy server in response to said list generation, an authentication, authorization, and accounting server ("AAA server") of said computing system of the CPE's attempt to access the Internet;
- notifying, by said AAA server, said policy server if said CPE has a prepaid service plan;
- generating, by said policy server, a certificate in response to said notification, said certificate comprising information necessary for said CPE to access the Internet via one of said at least one access points, and sending, by said policy server, said notification and said certificate to said access controller;
- attempting, by said access controller, to connect to the Internet at one of said at least one access points by means of a beacon SSID, and forwarding, by said access points, said attempt to connect to the Internet to said AAA server;
- authenticating, by said AAA server upon receipt of said attempt, said attempt to connect to the Internet, communicating, by said AAA server, with said access point to allow said CPE to connect to the Internet, and notifying, by said AAA server, said resource server that said CPE has connected to said access point;
- sending, by said access point, authorization information to said access controller;
- completing, by said access controller, said connection with said access point; and
- accessing, by said CPE upon said completion of said connection, the Internet.

18. A method for load balancing a computer networking infrastructure as claimed in claim 17, wherein said list comprises SSIDs, capacity information, and status information for said available access points.

19. A method for load balancing a computer networking infrastructure as claimed in claim 17, wherein said list comprises SSIDs associated with said available access points instead of said available access points.

* * * * *